United States Patent [19]

Gosling

[11] 3,969,675
[45] July 13, 1976

[54] SINGLE SIDE-BAND RADIO

[75] Inventor: Harold William Gosling, Sketty, Swansea, Wales

[73] Assignee: National Research Development Corporation, London, England

[22] Filed: Dec. 30, 1974

[21] Appl. No.: 537,329

Related U.S. Application Data

[63] Continuation of Ser. No. 371,469, June 19, 1973, abandoned.

[30] Foreign Application Priority Data

June 20, 1972 United Kingdom............... 28783/72

[52] U.S. Cl.................................. 325/50; 325/62; 325/137; 325/330
[51] Int. Cl.² ........................................ H04B 1/68
[58] Field of Search.................... 325/49, 50, 61–64, 325/137, 138, 329, 330, 31; 332/44, 45; 329/50, 116, 166; 333/14; 179/1 VL, 1 VC, 15 AV

[56] References Cited
UNITED STATES PATENTS

| | | | |
|---|---|---|---|
| 3,004,104 | 10/1961 | Hembrooke | 325/31 |
| 3,271,681 | 9/1966 | McNair | 325/50 |
| 3,271,682 | 9/1966 | Bucher, Jr. | 325/50 |
| 3,274,492 | 9/1966 | Van Kessel et al. | 325/50 |
| 3,377,559 | 4/1968 | Stewart | 325/61 |
| 3,437,941 | 4/1969 | Leary | 329/50 |
| 3,458,815 | 7/1969 | Becker | 325/62 |
| 3,543,164 | 11/1970 | Mayefskie et al. | 325/330 |
| 3,582,788 | 6/1971 | Castagna | 325/62 |

Primary Examiner—Robert L. Griffin
Assistant Examiner—Jin F. Ng
Attorney, Agent, or Firm—Cushman, Darby & Cushman

[57] ABSTRACT

A single side-band electrical information-transmission system is described in which the correct oscillator frequency for demodulation in the receiver is achieved by attenuating a narrow band of audio frequencies in the transmitter and automatically correcting demodulation in the receiver in accordance with the position in the frequency spectrum of this band after demodulation. Attenuation in the transmitter is carried out by a band-stop filter, and the receiver usually includes two band-pass filters, connected in parallel following the demodulator. The output from the filters is individually rectified, summed, and smoothed before being used as an automatic frequency control signal to correct the frequency of the oscillator coupled to the demodulator.

22 Claims, 23 Drawing Figures

SINGLE SIDE-BAND RADIO

This is a continuation, division, of application Ser. No. 371,469 filed June 19, 1973, now abandoned.

The present invention relates to single side-band (SSB) information transmission systems, particularly radio systems, telephony transmitters, receivers and clarifier circuits.

Increasing congestion in the frequency spectrum used for radio has led to the widespread use of single side-band techniques in the HF band, and serious consideration is being given to extension of this approach both to VHF and to broadcasting, if the many problems involved can be overcome. One difficulty with present day receivers for SSB on HF is that fine adjustment of the locally generated carrier frequency is necessary if the combination of the received spectrum with the local carrier is to result in a demodulated signal not seriously translated in frequency from the original audio. This adjustment is a manual control, set in accordance with a subjective judgement of the resulting speech quality. Some SSB systems retain a carrier component, and to this end the receiver carrier is phase locked, eliminating drift of frequency. An alternative is the transmission of a tone above the audio range, which can also actuate a frequency control system. Neither approach is satisfactory, since both require transmission of RF energy outside the spectrum of the SSB signal, with consequent extension of system bandwidth. Such techniques also infringe the principles of electromagnetic spectrum conservation that, since all radiated energy is capable of causing interference, only the minimum energy required to establish the required communication channel should be radiated.

According to a first aspect of the present invention there is provided electrical information-transmission apparatus including a transmitter, means for substantially attenuating signals in a predetermined portion of the frequency range of signals to be transmitted, the portion being within the said frequency range, a receiver which depends for correct operation in at least one respect, on establishing a first signal in the receiver of a frequency which is a predetermined function of the frequency of a second signal in the transmitter, frequency sensitive means for detecting the position in the frequency spectrum of a low amplitude portion of the output signals from the receiver corresponding to the said predetermined portion, and control means for controlling the frequency of the first signal in accordance with the output signal from the frequency-sensitive means.

In SSB the function relating to the frequencies of the first and second signals is usually one of equality.

According to a second aspect of the present invention there is provided single side-band information-transmission apparatus including filter means for substantially attenuating signals extending over a predetermined portion of the frequency range of input signals to be transmitted, the portion being within the said frequency range means for transmitting a single side-band signal modulated in accordance with the output signal from the filter means, a receiver having demodulation means for demodulating the received signal, frequency-sensitive means for detecting any departure from a nominal position in the frequency spectrum of a low amplitude portion in the band of signals from the demodulation means which corresponds to the said predetermined portion, the nominal position being the position in the frequency spectrum of the said predetermined portion, and control means for so changing the operation of the demodulation means in dependence upon the output signal from the frequency-sensitive means that any said departure from the nominal position is reduced.

According to a third aspect of the present invention there is provided a method of single side-band transmission including substantially attenuating signals in a predetermined portion of the frequency range of signals to be transmitted the portion being within the said frequency range, transmitting a single side-band signal modulated in accordance with the signals to be transmitted including those modified, receiving and demodulating the transmitted signals, forming a control signal dependent on any departure from a nominal position in the frequency spectrum of a low amplitude portion in the band of demodulated signals which correspond to signals in the said predetermined portion, the nominal position being the position in the frequency spectrum of the said predetermined portion, and correcting the demodulation process in accordance with the control signal to reduce any said error.

It is known that the suppression of a narrow band within the speech spectrum has little effect on intelligibility. It is believed that speech passed through a channel having a bandwidth from 230 to 3,255 Hz (with a high signal to noise ratio) will have a random syllable intelligibility of 92%, but that this will fall to 90% if a stop band is introduced 200 Hz wide, located between 1 and 2 Kilohertz.

Thus a stop band may be introduced into the transmitted spectrum with little loss, while in the receiver, circuits can be included which detect its location on the frequency spectrum after demodulation, and generate an error signal if it is displaced.

The advantage of the present invention is then that the frequency of the locally generated carrier, required for addition to the received signals before demodulation or detection, in the receiver can be adjusted without a carrier or vestigial carrier signal or any other additional signal outside the side-band, or even inside the band, being transmitted.

According to a fourth aspect of the present invention there is provided apparatus for transmitting electrical signals by radio or telephony comprising filter means for at least attenuating signals in a predetermined portion of the frequency range of input signals to be transmitted, and means for transmitting a single side-band signal carrying modulation dependent on the output signal from the filter means.

According to a fifth aspect of the present invention there is provided a receiver apparatus for use in receiving signals transmitted by apparatus according to the fourth aspect of the invention, including receiver means for receiving modulated single side-band signals, demodulation means for demodulating the received signal, frequency-sensitive means for detecting errors in the position in the frequency spectrum of that portion of the signals from the demodulation means which corresponds to the said predetermined portion, and control means for so changing the operation of the demodulation means in dependence upon the output signal from the frequency-sensitive means that any said error is reduced.

In this specification the term "hole" means that portion of the frequency spectrum in which all signals have been attenuated or substantially removed.

Preferably the frequency-sensitive means includes two band-pass filters. The upper limit of the pass band of one filter may be positioned in frequency immediately below the lower limit of the hole, when in the correct position, and the lower limit of the pass-band of the other filter is then positioned in frequency immediately above the upper limit of the hole, when in the correct position. The bandwidths of the filters are then equal to the bandwidth of the "hole". A difference circuit is provided for forming a control signal dependent on the difference in the output powers of signals from the filters.

In order to reduce errors due to characteristics of the spectrum of signals transmitted, the bandwidth of each filter may instead be half the bandwidth of the hole and then the lower limit of the pass-band of one filter coincides with the lower limit of the hole while the upper limit of the pass-band of the other filter coincides with the upper limit of the hole.

Where wide lock-in range and very small inserted carrier-frequency error is required four band-pass filters may be used. A first pair of filters each have pass-bands half the width of the hole but together cover the frequency range of the hole (when in the correct position), while the filters of the second pair have pass-bands of the same width as the hole but are situated one just above and one just below the hole (when in the correct position).

With four filters a combining circuit for signals representative of the output power of signals passed by the filters is provided such that while the actual position of the hole in the frequency spectrum is mainly in the region of the pass-bands of the filters of the first pair, then signals representative of the difference between the output power of signals passed by the first pair of filters is dominant in providing a control signal for correcting the demodulation carried out by the receiver, and while the actual position of the hole is mainly in the region of the pass-band of one of the filters of the second pair, then signals representative of the difference between the output power of signals passed by the second pair of filters is dominant in providing the said control signal.

Certain embodiments of the invention will now be described, by way of example, with reference to the accompanying drawings, in which:

FIGS. 3b and 3c show the idealized pass-bands of filters in the circuit of FIG. 1 in relation to FIG. 2a;

FIG. 4a shows the power which would be transmitted by the filters of the circuit of FIG. 1 if the spectral distribution of FIG. 3a were to be translated in frequency by varying amounts;

FIGS. 5b and 5c show the idealized pass-bands of filters in another form of the circuit of FIG. 1 in relation to FIG. 5a;

In some conventional SSB systems, input signals for transmission are modulated and the resulting signals are passed through a filter to remove the carrier and one side-band. The carrier may then be partially restored before one or more frequency translation stages provide the required transmission frequency. The output is power amplified before transmission. On reception the signal is passed through one or more intermediate frequency stages, and then detected or demodulated, the carrier removed or reduced in the transmitter being added or restored immediately before detection or otherwise used in the process of detection. Where the carrier is not transmitted the frequency of the carrier added before detection or otherwise used in that process requires constant manual adjustment, and where the carrier is partially transmitted it is separated and used to control the frequency of the carrier added.

Figure 1:
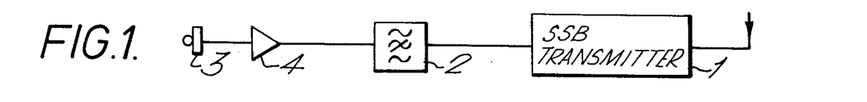
FIG. 1 is a block diagram of an SSB transmitter according to the invention.

In carrying out the present invention a conventional SSB transmitter 1 is modified by the addition of a band stop filter 2 connected between the audio circuits, shown in FIG. 1 as a microphone 3 and an audio amplifier 4, and the transmitter. The filter 2 prevents audio signals in a very narrow frequency range reaching the modulator. Where the transmitter normally transmits carrier another filter (not shown) is added to suppress the carrier.

Figure 2:
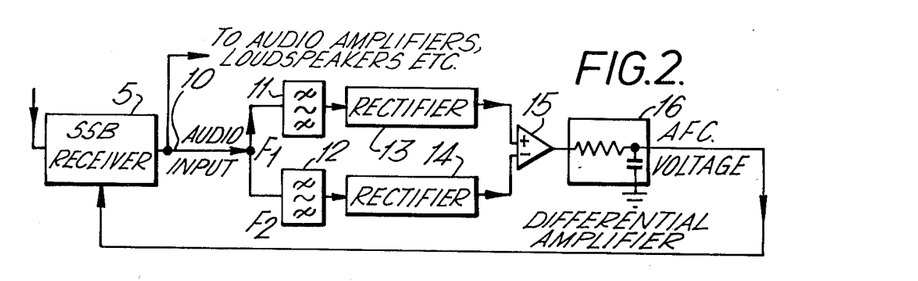
FIG. 2 is a block diagram of an SSB receiver according to the invention.

The receiver used is also the same as many conventional SSB receivers except that, in a first embodiment, it includes two band-pass filters in its clarifier circuit, and means for varying the local oscillator frequency for the demodulator circuit in accordance with the output signal of the clarifier circuit.

The invention may be applied to any SSB transmitter and receiver which is able to transmit and receive audio signals. For example the invention can be applied to RACAL transreceivers type TRA 906 "Squadcal". Details of SSB systems, transmitters and receivers may be found in "Single Sideband Principles and Circuits" by Pappenfus, Bruens and Schoenike, published by McGraw Hill.

In FIG. 2, the audio-output of an SSB receiver 5 is coupled to a clarifier consisting of filters 11 and 12, rectifiers 13 and 14, a differential amplifier 15 and an integrator circuit 16. Audio signals are passed to two parallel circuits comprising the band-pass filters 11 and 12 and the rectifier circuits 13 and 14. The band-pass filters each have a pass band of the same width as or less than, the stop band of the filter in the transmitter. The outputs of the rectifier circuits are connected to the differential amplifier 15 and thence to the integrator circuit 16 which provides an automatic frequency control (AFC) voltage for the SSB receiver 5 to vary the frequency of the carrier inserted before demodulation.

In the transmitter the hole in the audio frequency spectrum introduced by the band-stop filter 2 is approximately 100 Hz wide and is preferably centred between 1 and 2 KHz but may be anywhere in the audio spectrum. As discussed above this hole will hardly, if at all, reduce the intelligibility of speech.

Figure 3A:
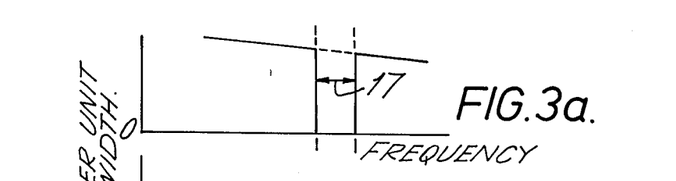
FIG. 3a is an idealized graph showing part of the spectral distribution of power in speech signals before modulation, or after error-free demodulation, in an apparatus according to the second aspect of the invention.
Figure 3B:
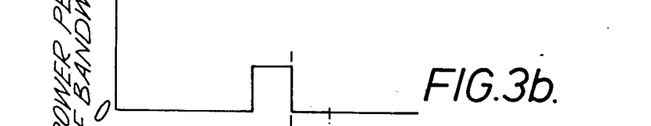
Figures 3C, 4A:
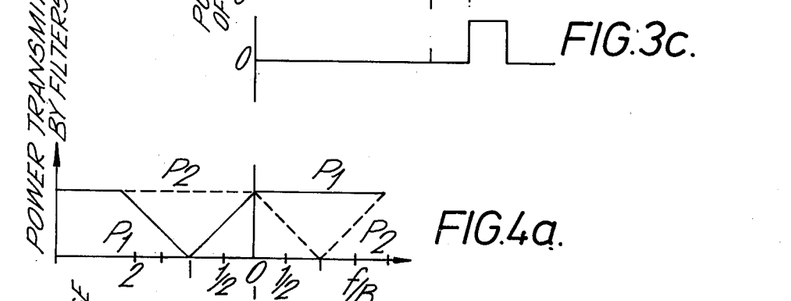
Figure 4B:
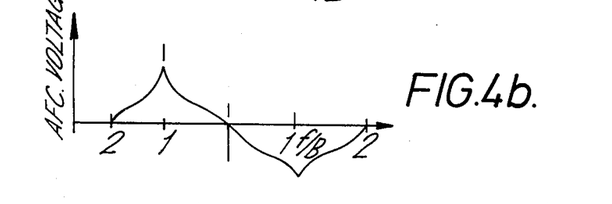
FIG. 4b shows the value of a voltage which would be provided by the circuit of FIG. 1 if the spectral distribution of FIG. 3a were to be translated in frequency by varying amounts.

Part of the received and demodulated audio spectrum is shown in FIG. 3a, and it is assumed, at first, that the hole shown at 17 is correctly positioned in the frequency spectrum. The positions of the pass-bands of the filters 11 and 12, in relation to the hole are shown in FIGS. 3b and 3c, respectively. Thus it can be seen that, within a lock-in range, if the hole 17 covers the wrong frequency range one filter will pass more power than the other and an AFC voltage will be developed. Such an error in the position of the hole occurs when the locally generated carrier inserted before or in the course of demodulation is not at the correct frequency. The AFC signal is applied to the local carrier oscillator (not shown) in such a sense, using known circuits, that the error is reduced.

Since the spectral density of speech falls at frequencies above 500 Hz, the output of the filter 11 is attenuated in order to equal, on average, that of the filter 12 when the system frequencies are correctly aligned. If the audio spectrum is translated by a frequency change f, the power transmitted by the filter 11, to good approximation, is given by $P_1$, where $P_1 = a$      for $f < -2B$ and $0 < f$ $= -a(\frac{f}{B}+1)$      for $-2B < f < -B$ $= +a(\frac{f}{B}+1)$      for $-B < f < 0$ In these expressions $a$ is a gain constant and $B$ is the bandwidth both of the audio spectrum hole and of the band pass filters. A similar expression holds for $P_2$, the power transmitted by the filter 12, and in FIG. 4a the dependence of $P_1$ and $P_2$ of f is plotted. Assuming the rectifier circuits 13 and 14 produce output voltage $E_1$ and $E_2$ proportional to the half powers of $P_1$ and $P_2$ respectively, it is easy to calculate the error voltage $E_x$ (given by $(E_1 - E_2)$) and in FIG. 3b this voltage is plotted against offset f. The circuit generates $E_x$, which may be used for AFC, over a range of $\pm 2B$. Thus for a hole 100 Hz wide, as assumed, a lock-in range of $\pm 200$ Hz is possible.

The system specifically described so far suffers from two disadvantages.

Firstly, even when the system is perfectly aligned the ratio of powers transmitted by the filters 11 and 12 differs for different speakers. The fall in spectral density at higher frequencies may be at a rate between 8 and 12 dB per octave for different speakers, thus the response of the filters cannot remain equal for all. With a hole centre frequency between 1 and 2 kHz and a width of 100 Hz for the transmitter filter 2, the receive filter centre frequencies will be separated by roughly one fifth of an octave. Total variation in relative response of the two filters will thus be only some 1 dB. From FIG. 3, assuming that $P_2$ can vary by $\pm \frac{1}{2}$dB, it can be deduced that the resulting frequency setting error is about $\pm 0.1B$ or about $\pm 10$ Hz for $B = 100$ Hz. This error in setting would not reduce intelligibility of speech, although perceptible.

Secondly, although the average voltages are as calculated, from moment to moment the outputs from the filters fluctuate widely. The rectified voltages can be averaged or integrated, but the defect of this approach is that the time constants concerned are inconveniently long. Exactly what constants will be required depends on the speaker and the part of the speech spectrum on which the system operates, but values greater than 0.25 and less than 10 seconds are required.

A more radical way of overcoming these disadvantages is to process the speech further prior to transmission. A controlled attenuator is incorporated in the transmitter audio channel. The attenuator has a selective characteristic, such that those frequencies which pass through the filter 11 are attenuated whilst those passing the filter 12 are unaffected. A simple control system is then arranged to maintain output powers from the filters 11 and 12 close to equality. Whilst such an arrangement cannot be expected to maintain perfect equality, it will ease smoothing.

Figure 5A:
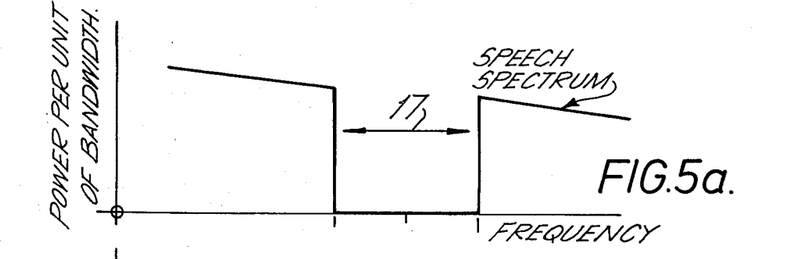
FIG. 5a is an idealized graph showing part of the spectral distribution of power in speech signals before modulation, or after error-free demodulation, in apparatus according to the second aspect of the invention.
Figures 5B, 5C:
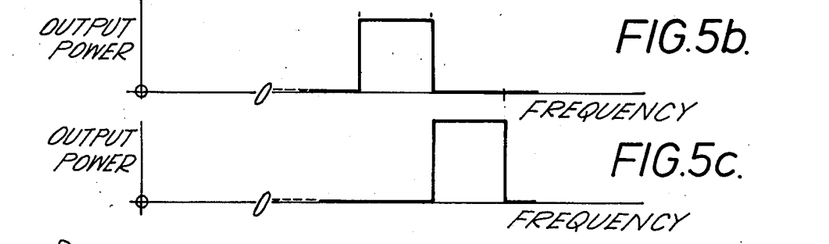

The two disadvantages mentioned above can also be at least partially overcome by using a receiver in which the filters 11 and 12 have pass bands extending across different halves of the hole when in its nominal position. In FIG. 5a the speech spectrum of FIG. 2a is repeated, and FIGS. 5b and 5c show the relationship of the pass bands of the filters 11 and 12, respectively. With the hole having a bandwidth B, the filters 11 and 12 now have bandwidths B/2 in the spectral positions shown.

Figure 6:
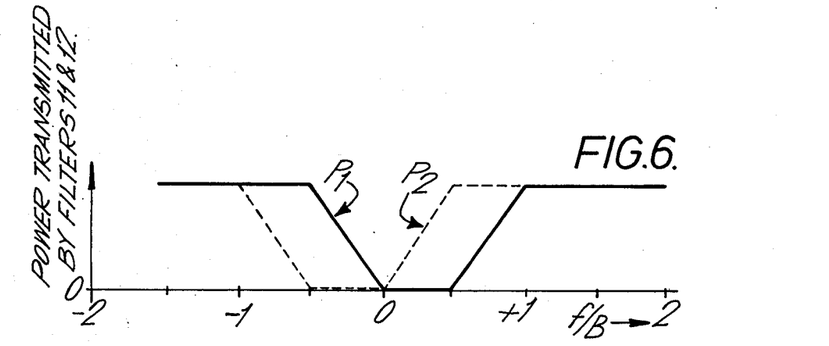
FIG. 6 shows the power which would be transmitted by the filters of the circuit of FIG. 1 if the spectral distribution of FIG. 5a were to be translated in frequency by varying amounts.
Figure 7:
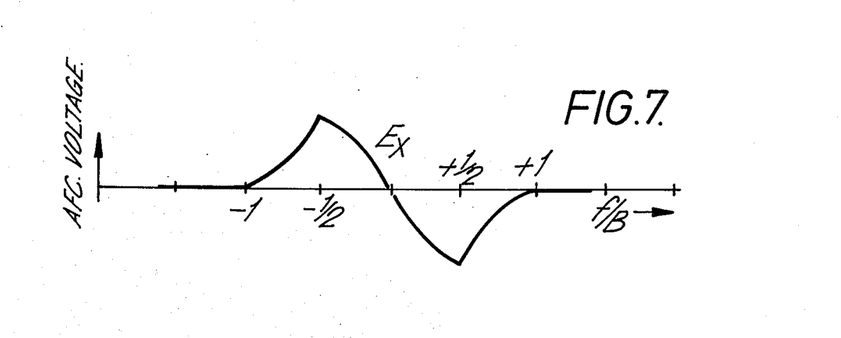
FIG. 7 shows the value of a voltage which would be provided by the circuit of FIG. 2 if the spectral distribution of FIG. 4a were to be translated in frequency by varying amounts.

The variations of $P_1$ and $P_2$ with f are shown in FIG. 6, and in FIG. 7 the approximate variation of $E_x$ is indicated.

Since both filters pass no power in the correctly aligned state the system is not subject to zero setting error as a result of speech spectrum variations. Because the error signal must always be of the right sign (but may fluctuate in amplitude with the speech intensity) in principle no smoothing of $E_x$ is necessary, thus the system responds much more quickly than that described previously. Its only disadvantage is that the lock-in range is $\pm B$, instead of $\pm 2B$ as previously.

Since both systems operate on a similar transmitted signal, sophisticated receivers combine both, to give a large lock-in range with small error when aligned.

Figure 8:
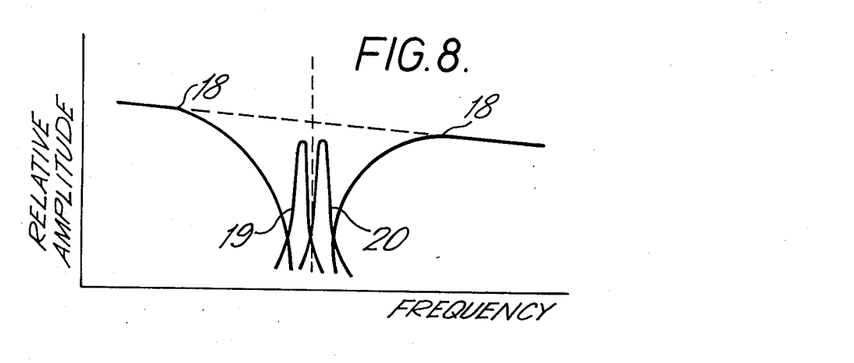
FIG. 8 shows the type of curve obtained in practice for part of the spectral distribution of power in speech signals before modulation, or after error-free demodulation, in apparatus according to the second aspect of the invention, and also shows the type of curve obtained in practice for the pass-bands of the filters in the circuit of FIG. 1.

As so far specifically described it has been assumed for simplicity and ease of calculation that the filters have "square" response curves and similarly the transmitted spectrum has a square hole. Practical filter characteristics and hole shape are indicated in FIG. 8, where the transmitted and nominal received audio spectrum is designated 18, and the characteristics of the filters 11 and 12 are designated 19 and 20, respectively.

The effect of practical shapes is firstly to extend slightly the lock-in range of the system, because of the response on the extended "skirts" of the filter curve, and secondly to cause a slight residual setting error because even when the system is lined up correctly, the skirts of the filters extend beyond the hole and overlap the AF spectrum on either side. If the spectrum is not quite uniform, the two filters are slightly differently affected, causing an offset error. The effect is made small by suitable choice of filter characteristic, and by keeping the hole in the AF spectrum narrow. Thus it is more likely that the parts of the spectrum on either side of the hole will be closely similar.

The lock-in range of the system is proportional to the width of the AF spectrum hole. If as described above the hole is 100 Hz wide a lock-in range of ± 100 Hz, or a little more, is obtained dependent on the details of the filter widths and nominal settings. A hole as narrow as this will have a negligible effect on intelligibility, indeed to all but the most critical listener it will not even be perceptible. However a muchh wider hole can be used: for example published theoretical work suggests that a hole 1,000 Hz wide would reduce sentence intelligibility from 100% to 90%. This might be too much reduction to be acceptable, but a 500 Hz hole might be permissible and would give a ± 500 Hz or more lock-in range. For a communication channel with a pass-band from 250 – 3,255 Hz the sentence intelligibility falls from 98% with no hole to 97.5% with a 200 Hz hole and 93.5% with a 500 Hz hole.

The system of FIGS. 1 and 2 will now be described in more detail with reference to filters, parameters and component values which it has been found give a system which functions well. The filters have characteristics which correspond to FIG. 14 in that the receiver filters 11 and 12 have a much narrower stop band than the transmitter filter 2.

Figure 9:
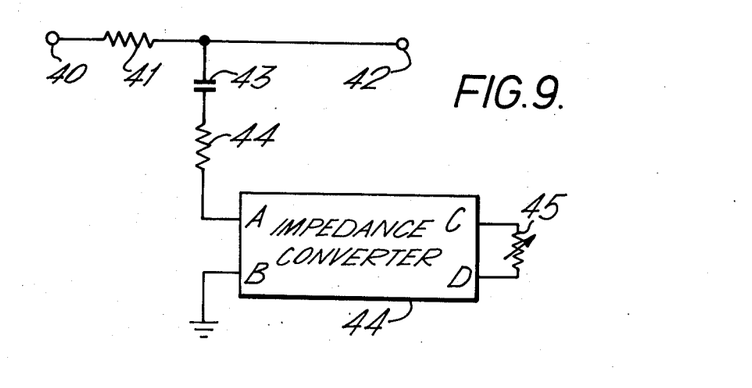
FIGS. 9 and 10 are circuit diagrams of a filter suitable for the transmitter of FIG. 1.
Figure 10:
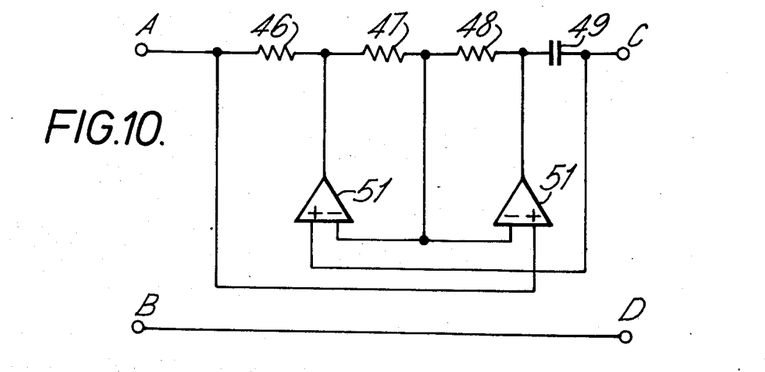

The circuit diagram of the filter 2 is shown in FIGS. 9 and 10 where an input terminal 40 is coupled by way of a 220 ohm series resistor 41 to an output terminal 42. The shunt path of the filter includes a 0.22μF capacitor 43 in series with a 12 ohm resistor 44 and a positive impedance converter 44 having terminals A, B, C and D. A 10 ohm potentiometer 45 is connected to the terminals 45 to adjust the centre frequency of the filter.

The circuit diagram of the converter 43 is shown in FIG. 10 and includes three resistors 46, 47 and 48 of values 300 ohms, 6.2 K ohms and 10 K ohms, respectively, in series with a 0.01 μF capacitor 49. Differential amplifiers 51 and 52 (type 741) are connected as shown.

The design of the filter 2 which is an active filter and other suitable transmitter and receiver filters is apparent from "The design of an audio frequency active RC band pass filter for a specific engineering requirement" by Haigh, D. G. and Jeffers, R. in the Radio and Electronic Engineer, Vol. 42, No. 8, 1972.

The filter of FIGS. 9 and 10 has a stop band 300 Hz wide between −3db points, centred on 1.6 KHz and with a maximum attenuation up to 20 db.

Figures 11, 12:
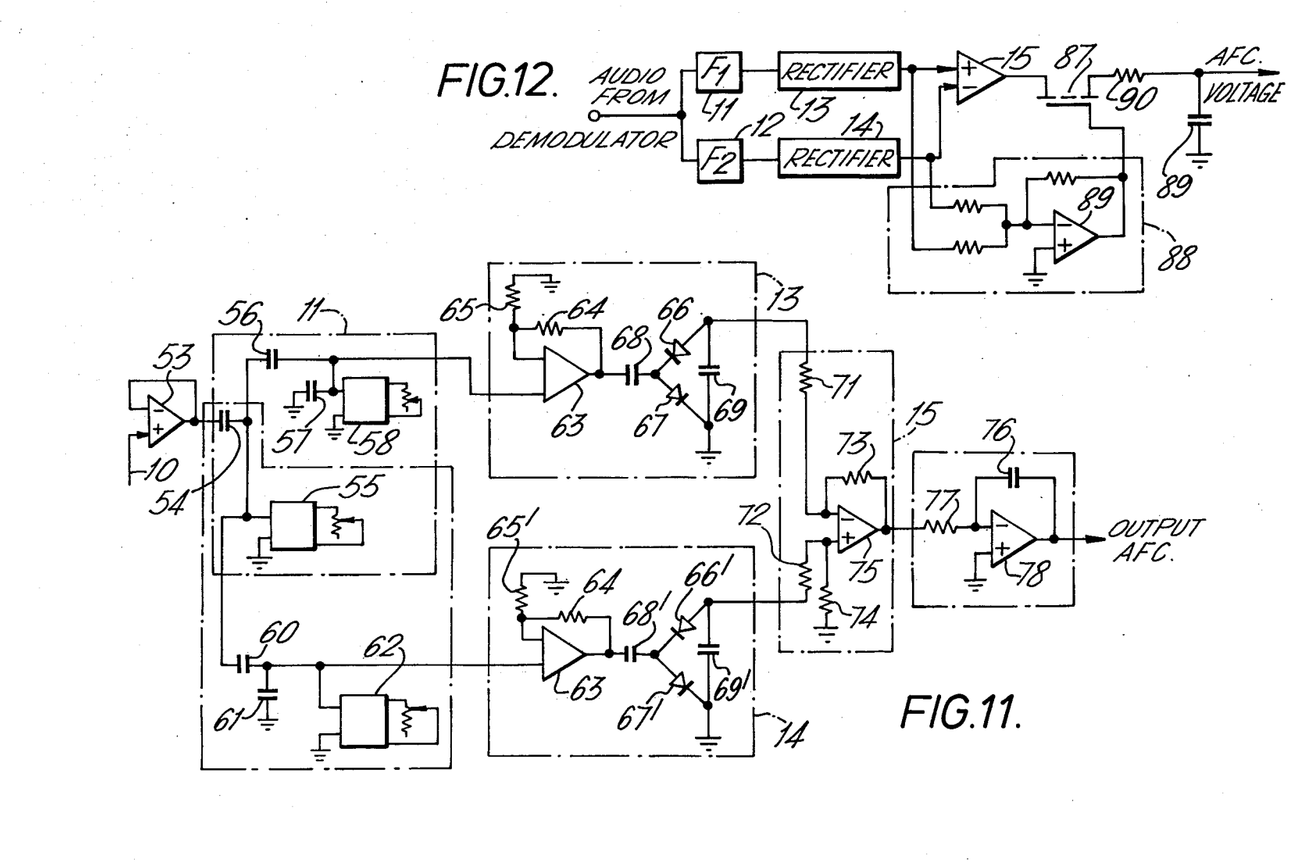
FIG. 11 is a circuit diagram suitable for the clarifier of FIG. 2.
FIGS. 12 and 13 are sample and hold circuits which may be used instead of the integrator of FIGS. 2 and 11.

FIG. 11 is a circuit diagram of the clarifier of FIG. 2. A type 741 operational amplifier 53, acting as a buffer, is connected to the input channel 10 and to the filters 11 and 12 indicated by dashed lines. The filters 11 and 12 have a common 0.22μF capacitor 54, and a common positive impedance converter 55 which is the same as that shown in FIG. 10. The remainder of the filter 11 comprises a series 2.7nF capacitor 56 and a shunt path comprising a 0.22μF capacitor 57 in parallel with a positive impedance converter 58. The filter 12 has an identical series capacitor 60 and identical shunt capacitor 61 and positive impedance converter 62. The three positive impedance converters 55, 58 and 62 all have a 10 Kilohm potentiometer connected across their terminals C and D. These potentiometers are set to give the required centre frequencies for the pass bands. The design of the filters 11 and 12 which are two-pole staggered active filters is also apparent from the above mentioned paper by Haigh and Jeffers.

The filters 11 and 12 have pass bands centred on 1.65 Hz and 1.55 Hz, respectively, and their pass bands are ± 20 Hz at −3db and ± 100 Hz at 40 db.

In FIG. 11 the rectifier circuits 13 and 14 are identical (designations in the filter 14 are primed) and each include a type 741 operational amplifier 63 with a 10 Kohm feedback resistor 64 and a 1 Kohm input shunt resistor 65. The amplifier output is connected to two oppositely poled small silicon rectifier diodes 66 and 67 by way of a 0.1μF capacitor 68, the ends of the diodes being connected through a further 0.1μF capacitor 69.

The outputs from the rectifier circuits 13 and 14 are connected to the differential amplifier 15 which consists of two 100 Kohm input resistors 71 and 72 and identically valued feedback and shunt resistors 73 and 74 connected to a type 741 operational amplifier 75. The integrator 16 again includes a type 741 operational amplifier 76 with a 10 Kohm input resistor 77 and a 6μF feedback capacitor 78.

Figure 13:
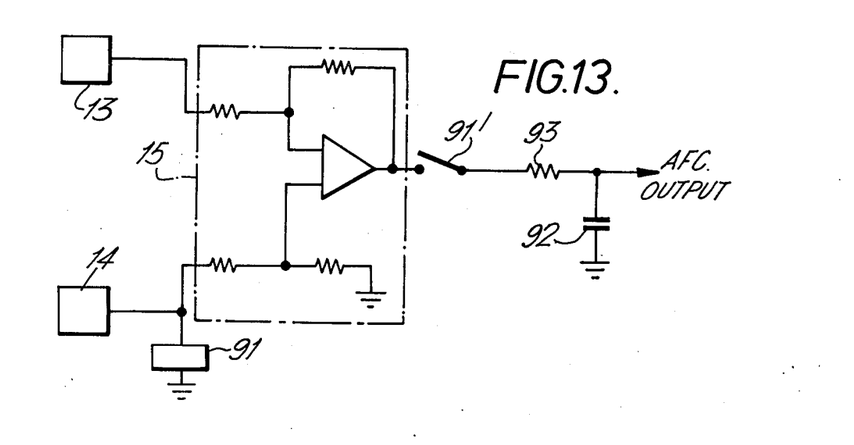

The integrator 16 of FIGS. 2 and 11 which is provided to smooth fluctuations in the output of the differential amplifier 15 due to quiet intervals, for example between words, in signals applied to the filters 11 and 12, may be replaced by the sample and hold circuits of FIGS. 12 and 13.

In FIG. 12 the outputs of the differential amplifier 15 are connected to the drain terminal of a field effect transistor (FET) 87 which has the property that it is virtually non-conducting until a suitable voltage is applied to its gate terminal. The rectifier circuits 13 and 14 are connected to a summing circuit 88 which includes an operational amplifier 89. The output of the summing circuit is connected to the gate of the FET 87 with the result that if either filter has significant output signal the FET conducts and a capacitor 89 charges through a resistor 90. Hence between words in an applied speech signal the capacitor 89 holds a voltage proportional to the last required AFC signal and at other times the AFC signal developed across the capacitor is corrected.

In FIG. 13 one output of the rectifier circuit 14 is taken to a relay 91 whose contacts 91', when closed, connect a 1μF capacitor 92 for charging from the differential amplifier 15 through a 10 Kohm resistor 93.

As with FIG. 12 when a signal is present at the output of the rectifier circuit 14 the capacitor 92 charges to provide an AFC voltage and at other times the capacitor 92 holds the last AFC voltage generated.

Figure 14:
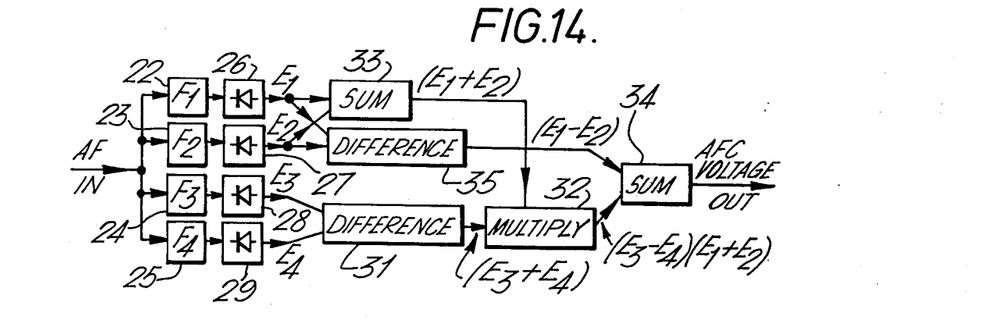
FIG. 14 is a block diagram of another clarifier circuit according to the invention.
Figure 15:
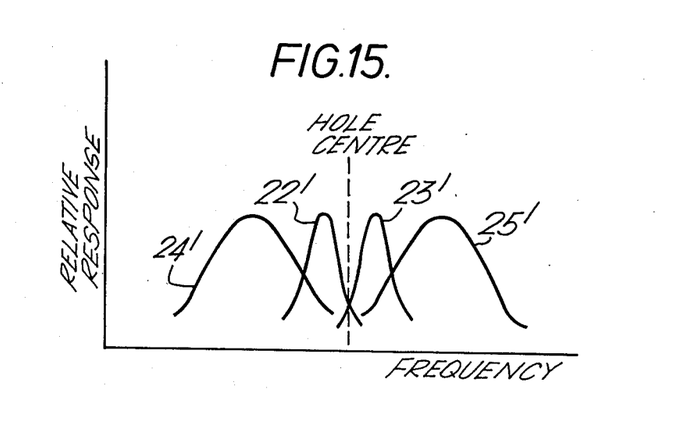
FIG. 15 shows the type of curve obtained in practice for the pass-bands of the filters in the circuit of FIG. 14.

If a still wider lock-in range is required than is obtainable from clarifiers of the type shown in FIG. 2, the clarifier of FIG. 14 may be used. Here four filters 22 to 25 are provided each with one of rectifier circuits 26 to 29 connected at its output. The characteristics of these filters are shown in FIG. 15 where the dashed designation corresponds to the filter designation. The filters are similar to those of FIG. 11 except that the filter 22 is tuned just below the centre of the transmitter filter, the filter 23 just above, the filter 24 well below and the filter 25 well above.

When the hole in the received audio falls outside the pass-bands of the filters 22 and 23, that is outside the lock-in range given by these filters, the filters 24 and 25 and a difference circuit 31 provide an error signal $E_3 - E_4$ where the output voltages of the rectifier circuits 28 and 29 are $E_3$ and $E_4$, respectively. This voltage passes to a multiplier 32 where it is multiplied by the sum of the output voltages $E_1$ and $E_2$ of the rectifier circuits 26 and 27 respectively, provided by a summing circuit 33. This has the effect of making the output of the multiplier small if the hole overlaps the pass-bands of either or both of the filters 22 and 23, that is if it is in their lock-in range.

The output signal from the multiplier circuit 32 is passed to a summing circuit 34 where it is added to the voltage from a difference circuit 35 which forms the difference of the voltages $E_1$ and $E_2$. Again this voltage will be small while the hole is outside the lock-in range of the filters 22 and 23. Hence the AFC voltage will at first depend on the output from the filters 24 and 25.

As soon as the frequency position of the hole is partially corrected so that it overlaps the pass-band of either of the filters 22 and 23, the output from the difference circuit 35 becomes comparatively large and controls the AFC voltage from the circuit 34.

Thus the filters 24 and 25 generate a correcting voltage at relatively large frequency deviations, when the differential output of the filters 22 and 23 has fallen to zero. The filters 22 and 23 increase the lock-in range, but because they depend on comparing parts of the AF spectrum well away from the "hole", and possibly separated by as much as 1KHz, the correcting AFC voltage from these filters probably has a relatively large error when the receiver is correctly aligned on the transmitted frequency. Hence the filters 22 and 23 are provided and operate in the way described in connection with FIGS. 5, 6 and 7, arrangements being made to derive the AFC voltage principally from these filters when the system is correctly aligned.

Systems of this kind probably give a lock-in range of some four times the hole width, with negligible additional setting error. It is, however, by the nature of the system, intrinsically unsatisfactory to extend the lock-in range must beyond ± 600 or 800 Hz, because the error correcting voltages would be irregular in occurrence and difficult to smooth if derived from very different parts of the spectrum.

Figure 16:
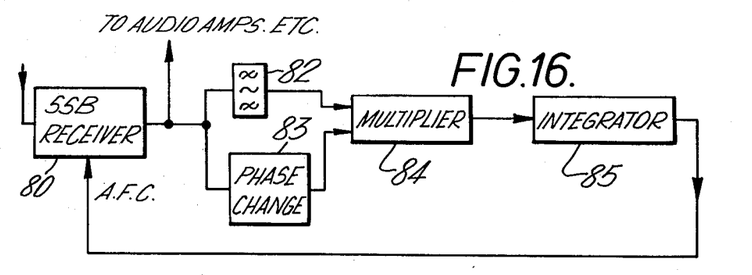
FIG. 16 is a block diagram of a further SSB receiver according to the invention.

An embodiment of a receiver according to the invention which in its basic form employs one band-pass filter is shown in FIG. 16. An SSB receiver 80 which is conventional except for the way in which its AFC signal is derived is coupled to the usual audio circuits (not shown) by way of a channel 81. The output of the receiver 80 also passes by way of two paths, one including a band-pass filter 82 and the other including a phase shift network 83 to an analogue multiplier 84. In general band pass filters impart a phase shift of 90° or more in one sense below the pass-band and a phase shift of 90° or more in the opposite sense above the pass-band, the phase shift varying progressively throught the pass-band with no phase shift at the centre frequency. The phase shift network 83 typically provides a phase shift of 90° relative to the centre of the pass-band at all audio frequencies.

When the hole coincides with the filter pass-band the filter output is very low and this causes the multiplier output to be low. If the hole now drifts up or down in frequency the filter output rises and the phase of the output signal depends on the direction of drift. The effect of multiplication by the circuit 84 is firstly to remove all components at the multiplier output which are not in the filter pass-band since the level of these components applied to the multiplier from the filter is negligible, and secondly to provide an output signal containing a d.c. component of magnitude and sign dependent on the amount and direction of drift of the hole. This d.c. component is in effect extracted by an integrator circuit 85 and applied as the AFC signal for the receiver 80. In order to obtain improved performance an additional band-pass filter (not shown) may be inserted at point 86.

Some examples will now be given of the choice of the different arrangements for different systems:

a. in the HF (short wave) band for professional communications between fixed stations, for which application a lock-in range of ± 200 Hz would be adequate, hence the system of FIG. 2 and a 200 or 300 Hz wide hole would be used.

b. in the HF band for aircraft communication, for which a ± 500 Hz lock range would be required due to Doppler effects. A 200 or 300 Hz hole and the four filter system of FIG. 14 is suitable.

c. in the MF (medium wave) band for broadcasting, in which case a very small hole of perhaps 100 Hz would be used, to avoid spoiling music, and a very modest lock-in range would be accepted.

d. at VHF for mobile (vehicular) radio, for which a lock-in range of ± 500 Hz is desirable, and the four filter system would be used.

Although a number of clarifier circuits have been specifically described many other arrangements are possible in carrying out the invention. For example instead of using two or more filters as in most of the specifically described embodiments a single filter could be used if it were of the type in which the centre frequency of the pass-band can be tuned cyclically over a narrow range of frequencies. The output of this filter can then be sampled at different times and applied to a cricuit for deriving the required AFC voltage.

Where SSB broadcasting is to be carried out it is important that good quality speech and music reproduction is possible. In these circumstances the signals occurring in the hole may be attentuated instead of being reduced to practically zero. For example the present invention can be applied where a 10:1 reduction in amplitude is made in the hole, and this allows signals so reduced to be restored in the receiver, replacing the hole completely.

Another possible different SSB system might use residual carrier to determine the frequency of the clarifier to be used in reception. In any SSB transmission there is always some residual carrier normally at a low level, so that in order for the receiver to lock on to the residual carrier a very narrow filter would be required in order to achieve a satisfactory signal to noise ratio. Such a filter makes tuning the receiver to the carrier difficult. This problem can be overcome with the present invention since it can be used to tune the receiver initially and then the receiver can be phase locked to the residual carrier.

The invention is particularly applicable to radio and telephony but can be applied in over system where a signal is required of frequency dependent on the frequency of a signal at a remote point and a narrow range of input signals can be attenuated or removed from a band of such signals without unduly affecting the intelligibility of the information received.

Furthermore instead of attenuating signals in a portion of the input band at the transmitter some other modification of these signals may be carried out, the position of the corresponding portion in the demodulated frequency spectrum being used to correct demodulation.

The modification may include not only the attenuation of signals in a portion of the input band but also the insertion in the resulting hole of a pilot signal at a predetermined frequency. At the receiver the pilot signal is separated and used to determine the frequency of the carrier added before detection or used in the detection process.

A modification of the invention can be applied to overcome the well known problem in the transmission of speech and music that a wide range of sound intensities must be accommodated. The capital cost of a radio transmitter is a function of the peak value of the power transmitted, and there is thus a serious loss of economy if, as is commonly the case with speech waveforms, peak signal power occurs only quite rarely and the average power level is much lower. For this reason it is commonplace to compress the volume range of the speech signal before transmission, making quiet passages louder and loud passages quieter. Moderate compression, such as is used by broadcast authorities, does not seriously affect the naturalness or intelligibility of speech, but gives only a small improvement in efficiency. It is preferable to use very severe compression at the transmitter, to give a quasi-constant signal, but in this event naturalness and, to some extent, intelligibility is lost unless provision is made to re-expand the signal at the receiver, in order to restore its original contrast range. Compression before transmission and subsequent re-expansion is known as companding.

In the automatic companding system to be described the depth of the hole in the received demodulated signal indicates the degree of compression and is used to provide the appropriate expansion.

Figure 17:
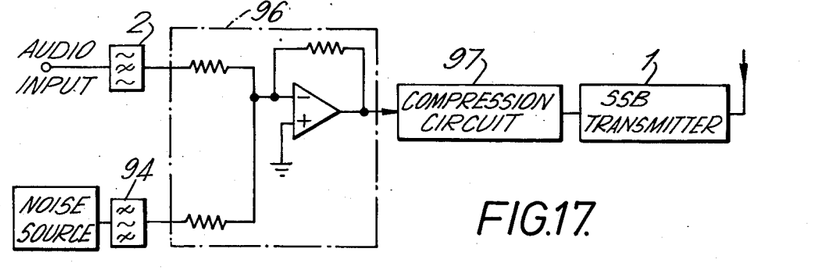
FIG. 17 is a block diagram a transmitter for using in a corresponding system according to the invention.

The transmitter of FIG. 17 includes an optional band-pass filter 94 having a pass-band of equal width to that of the stop band of the filter 2 and noise from a white noise source 95 is injected into the hole at a predetermined low level by means of a summing circuit 96. Thus the spectrum at the output of the summing circuit 96 is similar to that of the applied audio except that components within the hole are absent and the noise components in the hole are at a constant level regardless of audio fluctuations. For this application the filter 2 should have an attenuation of at least 40 db and preferably 60 db. The audio signals are then processed by a conventional compression circuit 97 which may for example be as described in the above mentioned book by Pappenfus, Bruene and Schoenike.

Due to the action of the compression circuits the hole signal component is no longer constant having, along with the audio signals, been greatly increased in the weak passages but left very small in the strong passages.

Figure 18:
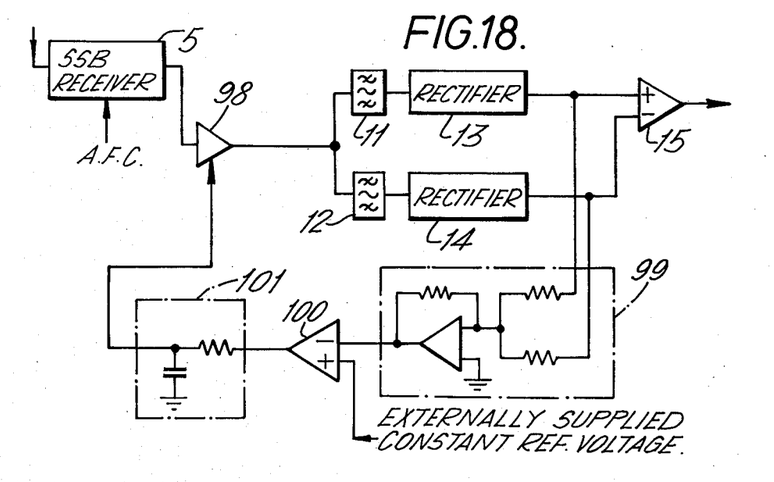
FIG. 18 is a block diagram of a receiver for use with the transmitter of FIG. 17.

The receiver for automatic expansion is shown in FIG. 18 and includes a variable gain amplifier 98 interposed between the audio output of the SSB receiver 5 of FIG. 2 and the filters 11 and 12. The outputs from the recitifiers 13 and 14, that is the noise signal in the hole, is summed in a circuit 99 and passed to a comparator 100 which receives a constant reference voltage. The output of the comparator is passed as a gain control signal for the amplifier 98 by way of a smoothing circuit 101. The sense of the applied gain control signal is such that the noise level in the hole is kept constant and in achieving this the audio signals are expanded by the required amount.

The modification described in connection with FIGS. 17 and 18 can be applied to other forms of radio transmission and in fact to any communication channel which is to be companded, for example telephone or magnetic tape recordings. In such systems a filter equivalent to the filter 2 is requried in the transmitter together with a noise source and a combining network, and the receiver requires a band pass filter and a rectifier, instead of the clarifier, a variable gain amplifier, a comparator and a smoothing circuit.

I claim:
1. A method of single side-band transmission including substantially attenuating signals in a predetermined portion of the frequency range of signals to be transmitted, the portion not extending to either frequency extremes of said range; modulating a carrier signal in accordance with the signals to be transmitted including those attenuated to provide a single side-band signal, transmitting the said single side-band signal, receiving and demodulating the transmitted signals to provide output signals dependent on the received signals and on a control signal, determining the extent of any departure in frequency from a nominal position of a low amplitude portion in the band of demodulated signals whic correspond to signals in the said predetermined portion, the nominal position being the position in the frequency spectrum of the said predetermined portion, and forming the control signal in accordance with any said departure in frequency determined, whereby the modulation process is corrected to reduce any said departure, said control signal not depending on any signal present in said predetermined portion of said frequency range.

2. Electrical information-transmission apparatus including attenuation means for substantially attenuating signals wthin a predetermined portion of the frequency range of signals to be transmitted, said portion not extending to either frequency extremes of said range,
 a transmitter, with input coupled to the attenuation means, for transmitting output signals dependent both on signals from the attenuation means and on a first operational signal present, in operation, in the tranmitter,
 a receiver for providing output signals dependent both on signals received from the transmitter and on a second operational signal present, in operation, in the receiver, the second operational signal having a frequency which is variable in response to a control signal and the output signals of the receiver only providing a true reproduction, in at least one respect, of signals applied to the apparatus when the frequency of the second operational signal is a predetermined function of the frequency of the first operational signal, frequency-sensitive means for detecting the position in the frequency spectrum of a low amplitude portion in the receiver output signals which corresponds to the said predetermined portion, and control means, coupled to the receiver and the frequency-sensitive means, for providing the said control signal in accordance with the output signal from the frequency-sensitive means, said control signal not depending on any signal present in said predetermined portion of said frequency range.

3. Single side-band information-transmission apparatus including filter means for substantially attenuating signals extending over a predetermined portion of the frequency range of input signals to be transmitted, said portion not extending to either frequency extremes of said range, means for modulating a signal in accordance with the output signal from the filter means to provide a single side-band signal and for transmitting the said single side-band signal, a receiver having demodulation means for demodulating the received signal to provide output signals dependent on the received signals and on a control signal applied to the receiver, frequency-sensitive means for detecting any departure in frequency from a nominal position of a low amplitude portion in the band of signals from the demodulation means which corresponds to the said predetermined portion, the nominal position being the position in the frequency spectrum, of the said predetermined portion, and control means, coupled to the output of the frequency-sensitive means, for providing the said control signal in accordance with the output signal of the frequency-sensitive means and for applying the said control signal to the receiver, said control signal not depending on any signal present in said predetermined portion of said frequency range.

4. Apparatus according to claim 3, including means, coupled at the output of said filter means, for setting the signal level in the said portion of the freqeuncy range to a constant level, low compared with signals in the remainder of the frequency range, means coupled at the input of the transmitter, for compressing amplitudes of signals over the whole frequency range of input signals including the said portion before transmission and means, coupled at the output of the receiver, for expanding amplitudes of signals received after demodulation to an extent dependent on the signal level in the said portion after demodulation.

5. Receiver apparatus adapted to receive and demodulate single side-band signals transmitted by transmitter apparatus in which a predetermined portion of the frequency range of input signals to be transmitted by the transmitter apparatus is substantially attenuated, said portion not extending to either frequency extremes of said range, the receiver apparatus including receiver means for receiving the said single side-band signals, and demodulation means for demodulating the received signals and on a control signal applied to the receiver, freqeuncy-sensitive means for detecting any departure in frequency from a nominal position of a low amplitude portion in the band of signals from the demodulation means which correspond to the said predetermined portion, the nominal position being the position in the frequency spectrum of the said predetermined portion, and control means, coupled to the output of the frequency-sensitive means, for providing the said control signal in accordance with the output signal of the frequency sensitive means and for applying the said control signal to the receiver means, said control signal not depending on any signal present in said predetermined portion of said frequency range.

6. Apparatus according to claim 5 for use in receiving transmitted signals in which the signal level in the said portion provides an indication of amplitude compression imparted to input signals for transmission including a variable gain amplifier coupled to the output of the demodulation means in the path of the receiver output signals, the gain of the amplifier varying in accordance with a gain control signal to expand the compressed amplitudes of signals corresponding to the said input signals and means, coupled to the output of the frequency sensitive means, for comparing the signal level of the said predetermined low amplitude portion of the frequency range with a reference signal to derive the gain control signal.

7. Clarifier apparatus for use with a single side-band receiver of the type which is adapted to receive and demodulate signals transmitted by transmitter apparatus in which a predetermined portion of the frequency range of input signals to be transmitted by the transmitter is substantially attenuated, said portion not extending to either frequency extremes of said range, the receiver including demodulation means for demodulating received signals to provide output signals dependent on the received signals and on a characteristic of a control signal applied to the receiver, and the clarifier apparatus including frequency-sensitive means for providing the control signal with the characteristic varying according to any departure in frequency, from a nominal position of a low amplitude portion in the band of signals from the demodulation means which corresponds to the said predetermined portion, the nominal position being the position in the frequency spectrum of the said predetermined portion, said control signal not depending on any signal present in said predetermined portion of said frequency range.

8. Apparatus according to claim 7 wherein the freqeuncy-sensitive means includes a band pass filter centered on the center frequency of the said predetermined portion and coupled to receive demodulated signals, a phase-change circuit also coupled to receive demodulated signals, a multiplier circuit for multiplying together the output signals of the filter and the phase-change circuit, and smoothing means coupled at the output of the multiplier circuit.

9. Apparatus according to claim 8 wherein the phase-change circuit imparts a phase change of $90° \pm 10°$.

10. Apparatus according to claim 7, wherein the frequency-sensitive means includes at least a first band-pass filter for attenuating signals having frequencies above and below a first pass-band of frequencies, relative to signals having frequencies within said first pass-band, said first pass-band being below the center frequency of said predetermined portion, a second band-pass filter for attenuating signals having frequencies above and below a second pass-band of frequencies relative to signals having freqencies within said second pass-band, said second pass-band being above said center frequency, and means for processing the output signals from the filters to provide a signal, the magnitude and sign of which are indicative of any departure from the said nominal position in the frequency spectrum of the said low amplitude portion in signals from the demodulation means.

11. Apparatus according to claim 10, wherein the pass-band of each filter is positioned in the frequency spectrum substantially within the frequency range of the said predetermined portion.

12. Apparatus according to claim 10 wherein the frequency-sensitive means includes third and fourth band pass filters with pass-bands positioned in the frequency spectrum adjacent to those of the first and second filters but with the pass-bands of the third and fourth filters below and above the pass-bands of the first and second filters, respectively, and the frequency-sensitive means also includes a combining circuit coupled to the first, second, third and fourth filters comprising first combining means for providing a signal representative of the difference between the output power of signals passed by the first and second filters, second combining means for providing a signal representative of the difference between the output power of signals passed by the third and fourth filters, means for forming the said control signal from the output signals of the first and second combining means, detection means, coupled to the outputs of the first and second filters, for providing an output signal indicating how nearly the actual position in the frequency spectrum of the said low amplitude portion in the signals from the demodulation means approaches the center frequency of the predetermined portion, and proportional means, coupled between the second combining means and the means for forming the control signal, for reducing the proportion of the signal from the second combining means used in forming the said control signal as the output signal from the detection means indicates that the said actual position approaches the center frequency.

13. Apparatus according to claim 12 wherein the first combining means includes and a first subtraction circuit, coupled to the outputs of the first and second filters, the second combining means includes a second subtraction circuit coupled to the outputs of the third and fourth filters, the detection means includes a first summing circuit coupled to the outputs of the first and second filters, the proportional means includes multiplying means for multiplying the output of the first summing circuit by the output of the second subtraction circuit and the means for forming the control signal includes a second summing circuit coupled to the outputs of the first subtraction circuit and the multiplying means.

14. Apparatus according to claim 10 wherein the means for processing the filter output signals includes first and second rectifier circuits, coupled to the output of the first and second filters, respectively, and subtraction means for subtracting the output signals of the rectifier circuits.

15. Apparatus according to claim 14 including means for coupling the output of the subtraction means to smoothing means.

16. Apparatus according to claim 14 including a variable gain amplifier coupled to the output of the demodulation means in the path of the receiver output signals, the gain of the amplifier varying in accordance with a gain control signal, means coupled to said rectifier circuits for summing the output signals thereof, and means for comparing the summed outputs so obtained with a reference signal to provide said gain control signal.

17. Apparatus according to claim 14, including sampling means for detecting a condition in which the output of at least one of the filters is greater than zero, means for holding the output signal from the subtraction means, and means, coupled to the sampling means, for coupling the subtraction means to the holding means when the said condition exists.

18. Apparatus according to claim 10 wherein the pass-band of each filter is positioned in the frequency spectrum substantially outside the frequency range of the said predetermined portion.

19. Apparatus according to claim 18 where the means for processing the filter output signals includes first and second rectifier circuits, coupled to the output of the first and second filters, respectively, and subtraction means for subtracting the output signals of the rectifier circuits.

20. Apparatus according to claim 19 including means for coupling the output of the subtraction means to smoothing means.

21. Apparatus according to claim 19 including a variable gain amplifier coupled to the output of the demodulation means in the path of the receiver output signals, the gain of the amplifier varying in accordance with a gain control signal, means coupled to said rectifier circuits for summing the output signals thereof, the rectifier circuits coupled to the first means for comparing the summed outputs so obtained with a reference signal to provide said gain control signal.

22. Apparatus according to claim 19 including sampling means for detecting a condition in which the output of at least one of the filters is greater than zero, means for holding the output signal from the subtraction means, and means, coupled to the sampling means, for coupling the subtraction means to the holding means when the said condition exists.

* * * * *